(12) United States Patent
Gobara

(10) Patent No.: US 10,080,058 B2
(45) Date of Patent: Sep. 18, 2018

(54) COMMUNICATION SYSTEM, INFORMATION PROCESSING DEVICE, AND COMMUNICATION METHOD

(71) Applicant: Panasonic Intellectual Property Management Co., Ltd., Osaka (JP)

(72) Inventor: Kunio Gobara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/023,682

(22) PCT Filed: Apr. 3, 2015

(86) PCT No.: PCT/JP2015/001899
§ 371 (c)(1),
(2) Date: Mar. 22, 2016

(87) PCT Pub. No.: WO2015/155967
PCT Pub. Date: Oct. 15, 2015

(65) Prior Publication Data
US 2016/0234559 A1     Aug. 11, 2016

(30) Foreign Application Priority Data

Apr. 11, 2014 (JP) ................................. 2014-081662
Jan. 30, 2015 (JP) ................................. 2015-017868

(51) Int. Cl.
*H04N 21/4788* (2011.01)
*H04N 5/765* (2006.01)
(Continued)

(52) U.S. Cl.
CPC ......... *H04N 21/4788* (2013.01); *H04N 5/765* (2013.01); *H04N 21/4355* (2013.01); *H04N 21/482* (2013.01); *H04N 21/632* (2013.01)

(58) Field of Classification Search
CPC .......... H04N 21/4126; H04N 21/4147; H04N 7/181; H04N 21/41407; H04N 21/432;
(Continued)

(56) References Cited

U.S. PATENT DOCUMENTS

2003/0086023 A1* 5/2003 Chung ............... H04N 7/17318
                                                                    348/714
2003/0126277 A1  7/2003 Son et al.
(Continued)

FOREIGN PATENT DOCUMENTS

JP          9-102827         4/1997
JP          2002-026942      1/2002
(Continued)

OTHER PUBLICATIONS

International Search Report of PCT application No. PCT/JP2015/001899 dated Jun. 30, 2015.
(Continued)

*Primary Examiner* — Nathan Flynn
*Assistant Examiner* — Cynthia Fogg
(74) *Attorney, Agent, or Firm* — McDermott Will & Emery LLP

(57) ABSTRACT

In communication system which includes server, information processing device and receiving device that performs transfer of a content item, information processing device includes a display broadcast station list receiver that receives display information for displaying a list of one or more content items from server through a first connection made based on a first communication mode. Moreover, information processing device includes a P2P connection implementation unit that establishes, between receiving device and information processing device, a second connection made based on a second communication mode for performing communication between receiving device and information
(Continued)

processing device without passing via server. Furthermore, information processing device includes: a broadcast station selector that selects at least one content item out of the one or more content items based on the display information; and an already converted broadcast receiver that receives the transfer of the at least one selected content item from receiving device through the established second connection.

6 Claims, 12 Drawing Sheets

(51) Int. Cl.
*H04N 21/482* (2011.01)
*H04N 21/435* (2011.01)
*H04N 21/63* (2011.01)

(58) Field of Classification Search
CPC ....... H04N 21/43615; H04N 21/44788; H04N 21/4355; H04N 5/765; H04N 21/482; H04N 21/632; H04N 21/4788
USPC .......................................................... 725/61
See application file for complete search history.

(56) References Cited

U.S. PATENT DOCUMENTS

| | | | | |
|---|---|---|---|---|
| 2005/0251827 | A1* | 11/2005 | Ellis | H04N 5/44543 725/47 |
| 2007/0101024 | A1* | 5/2007 | Doumuki | H04L 12/2805 709/246 |
| 2007/0232221 | A1* | 10/2007 | Miyata | H04H 60/42 455/3.01 |
| 2008/0117922 | A1* | 5/2008 | Cockrell | H04L 12/66 370/401 |
| 2009/0077046 | A1* | 3/2009 | Narahara | G06F 17/30053 |
| 2009/0210533 | A1 | 8/2009 | Verhaegh et al. | |
| 2009/0288127 | A1* | 11/2009 | Corson | H04H 20/08 725/110 |
| 2009/0313658 | A1* | 12/2009 | Nishimura | H04N 5/44543 725/59 |
| 2015/0003815 | A1 | 1/2015 | Hill et al. | |
| 2016/0344745 | A1 | 11/2016 | Johnson et al. | |

FOREIGN PATENT DOCUMENTS

| | | |
|---|---|---|
| JP | 2003-163869 | 6/2003 |
| JP | 2005-085146 | 3/2005 |
| JP | 2005-252403 | 9/2005 |
| JP | 2008-118677 | 5/2008 |
| JP | 2009-089432 | 4/2009 |
| JP | 2009-189059 | 8/2009 |
| JP | 2010-200380 | 9/2010 |
| JP | 2012-029200 | 2/2012 |

OTHER PUBLICATIONS

J. Rosenberg, J. Weinberger, C. Huitema, R. Mahy, "STUN—Simple Traversal of User Datagram Protocol (UDP) Through Network Address Translators (NATs)", [Online], Mar. 2003, Network Working Group Request for Comments: 3489, [searched on Mar. 23, 2014], Internet <URL: http://www.ietf.org/rfc/rfc3489.txt>.
The Extended European Search Report dated Feb. 1, 2017 for the related European Patent Application No. 15776163.6.
The Extended European Search Report dated Feb. 1, 2017 for the related European Patent Application No. 15776776.5.
Non-Final Office Action issued in related U.S. Appl. No. 15/023,387, dated Jan. 9, 2017.
Final Office Action issued in related U.S. Appl. No. 15/023,387, dated Jul. 7, 2017.
International Search Report of PCT Application No. PCT/JP2015/001898 dated Jun. 30, 2015; with English translation.

* cited by examiner

FIG. 9

| | 191 | 192 | 193 | 194 | 195 | 196 | 197 |
| DEVICE ID | ch | networkid | tsid | serviceid | BROADCAST STATION NAME | UPDATE DATE AND TIME |
|---|---|---|---|---|---|---|
| 123400 | 101 | 0001 | 0001 | 0001 | AEX | 2013/04/27 08:00 |
| 123400 | 102 | 0001 | 0001 | 0002 | BOX | 2013/04/27 08:00 |
| 123400 | 103 | 0001 | 0001 | 0003 | FOBY | 2013/04/27 08:00 |
| ⋮ | | | | | | |
| 123400 | 201 | 0001 | 0001 | 0201 | WON1 | 2013/04/27 08:00 |
| 123400 | 202 | 0001 | 0001 | 0202 | WON2 | 2013/04/27 08:00 |
| ⋮ | | | | | | |
| 123401 | 101 | 0001 | 0001 | 0001 | AEX | 2013/04/27 08:11 |
| 123401 | 102 | 0001 | 0001 | 0002 | BOX | 2013/04/27 08:11 |
| 123401 | 103 | 0001 | 0001 | 0003 | FOBY | 2013/04/27 08:11 |
| ⋮ | | | | | | |

FIG. 10

| ch | networkid | tsid | serviceid | BROADCAST STATION NAME | UPDATE DATE AND TIME |
|---|---|---|---|---|---|
| 301 | 0001 | 0001 | 0301 | OYS | 2013/04/27 08:00 |
| 602 | 0001 | 0001 | 0602 | 6SIX | 2013/04/27 08:00 |
| ⋮ | | | | | |

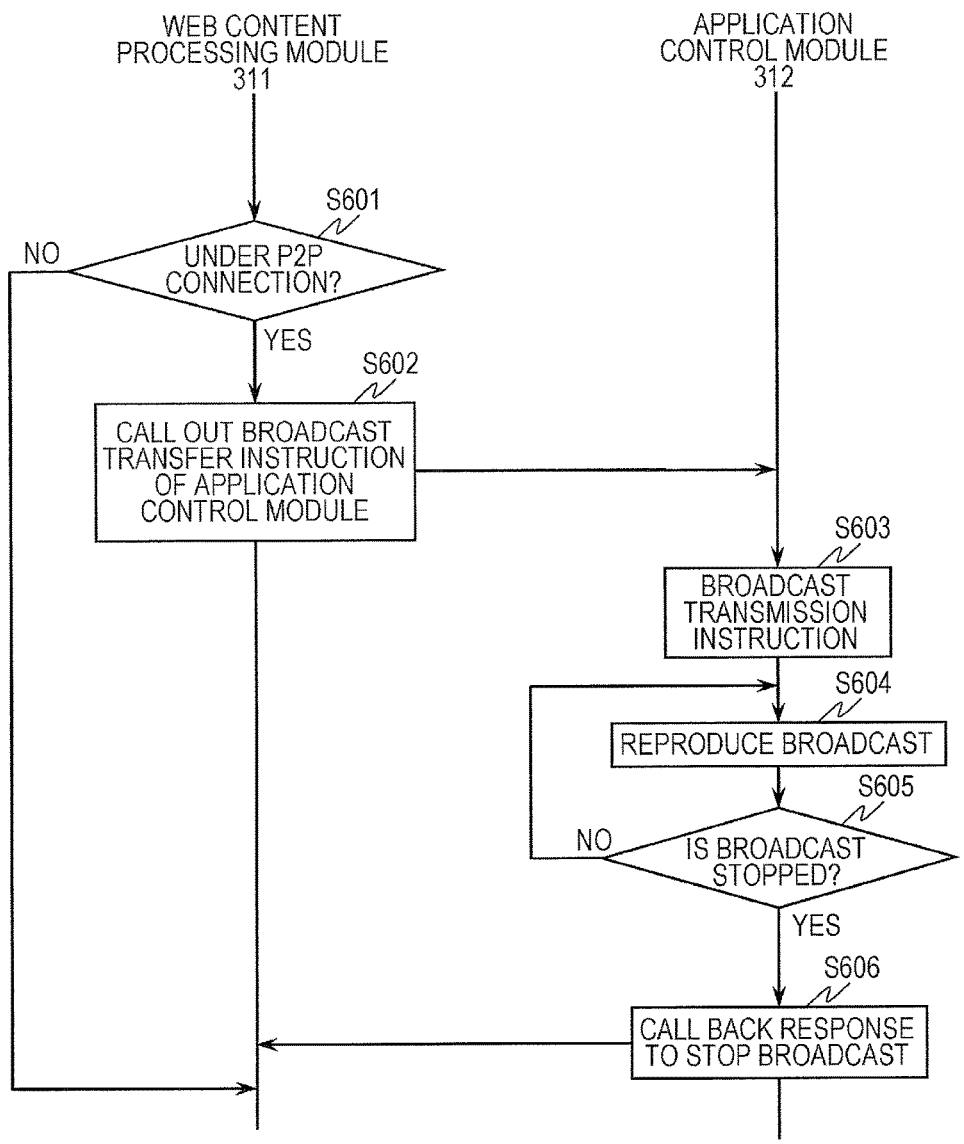

COMMUNICATION SYSTEM, INFORMATION PROCESSING DEVICE, AND COMMUNICATION METHOD

This application is a U.S. national stage application of the PCT international application No. PCT/JP2015/001899 filed on Apr. 3, 2015, which claims the benefit of foreign priority of Japanese patent applications No. 2014-081662 filed on Apr. 11, 2014 and 2015-017868 filed on Jan. 30, 2015, the contents all of which are incorporated herein by reference.

TECHNICAL FIELD

The present disclosure relates to a communication system or the like, which transfers, from a transfer device capable of receiving one or more content items, at least one of the one or more content items to an information processing device for reproducing the content item.

BACKGROUND ART

As a technique for remotely controlling an electronic device with accuracy even from a remote location, a communication system as described in PTL 1 is known. In the communication system described in PTL 1, a portable terminal operated by a user, a database, a video recorder and a base station communicate with one another via a network. In the database, as information required for a VTR (Videotape Recorder) to make a recording reservation, a program guide is recorded, which is includes, for example, broadcast channels, broadcast starting times and the like of broadcast programs. The portable terminal of the user communicates with the database via the base station and the network, to receive the program guide from the database and display the program guide. The user refers to the program guide, and confirms a broadcast channel, broadcast starting time and the like of a program to be subjected to the recording reservation. Then, the user issues an instruction on the program to be subjected to the recording reservation to the portable terminal. Information on the program on which the instruction is issued by the user is transmitted from the portable terminal via the base station and the network to the VTR. In this manner, the VTR executes the recording reservation based on the received information on the program. As described above, the user can allow the VTR to make the recording reservation by using the portable terminal from any location as long as the location is in an environment where the portable terminal connects to the network.

Moreover, in NPL 1, there is disclosed a technique in which two terminals belonging to different networks perform communication by the Peer to Peer connection that does not pass via a server. In this manner, a load on the server can be reduced. Note that the "Peer to Peer" is hereinafter referred to as "P2P".

CITATION LIST

Patent Literature

PTL 1: Unexamined Japanese Patent Publication No. H09-102827

Non-Patent Literature

NPL 1: J. Rosenberg, J. Weinberger, C. Huitema, R. Mahy, "STUN-Simple Traversal of User Datagram Protocol (UDP) Through Network Address Translators (NATs)", [Online], March 2003, Network Working Group Request for Comments: 3489, [searched on Mar. 23, 2014], Internet <URL:http://www.ietf.org/rfc/rfc3489.txt>

Display

The present disclosure provides a communication system that realizes an operation, which does not give a feeling of inconvenience to a user, while reducing a load on a server.

A communication system in the present disclosure includes a server, an information processing device for reproducing a content item, and a transfer device that performs transfer of at least one content item out of one or more content items. The information processing device includes: a display information receiver that receives display informationdisplay information for displaying a content list as a list of the one or more content items from the server through a first connection made based on a first communication mode; and a communication establishment unit that establishes a second connection between the transfer device and the information processing device, the second connection being made based on a second communication mode for performing communication between the transfer device and the information processing device without passing via the server. Moreover, the information processing device includes: a content selector that selects at least one content item out of the one or more content items based on the display informationdisplay information; and a content receiver that receives the at least one content item from the transfer device through the second connection established by the communication establishment unit, the at least one content item being selected by the content selector.

An information processing device in the present disclosure includes: a display information receiver that receives display information for displaying a content list as a list of one or more content items through a first connection made based on a first communication mode; and a communication establishment unit that establishes a second connection made based on a second communication mode different from the first communication mode. Moreover, the information processing device includes: a content selector that selects at least one content item out of the one or more content items based on the display information; and a content receiver that receives the at least one content item through the second connection established by the communication establishment unit, the at least one content item being selected by the content selector.

In accordance with the communication system, the information processing device and the communication method in the present disclosure, the operation that does not give the feeling of inconvenience to the user can be realized while reducing the load on the server.

BRIEF DESCRIPTION OF DRAWINGS

FIG. 9 is a diagram showing an example of data accumulated in a broadcast station list accumulator in the exemplary embodiment.

FIG. 10 is a diagram showing an example of a list of broadcast transfer-prohibited broadcast stations in the exemplary embodiment.

FIG. 14 is a diagram showing an example of a flowchart of processing from selection of the broadcast station to reproduction of the broadcast program in the exemplary embodiment.

DESCRIPTION OF EXEMPLARY EMBODIMENT

A description is made below in detail of an exemplary embodiment with reference to the drawings as appropriate. However, a detailed description more than necessary is omitted in some cases. For example, a detailed description of a well-known item and a duplicate description of substantially the same configuration are omitted in some cases. These omissions are made in order to avoid unnecessary redundancy of the following description and to facilitate the understanding of those skilled in the art.

Note that the inventor provides the accompanying drawings and the following description in order to allow those skilled in the art to fully understand the present disclosure, and does not intend to thereby limit the subject described in the scope of claims.

Exemplary Embodiment

A description is made below of an exemplary embodiment with reference to FIG. 1 to FIG. 14.
[1-1 Configuration]
[1-1-1. Schematic Configuration of Communication System]

Figure 1:
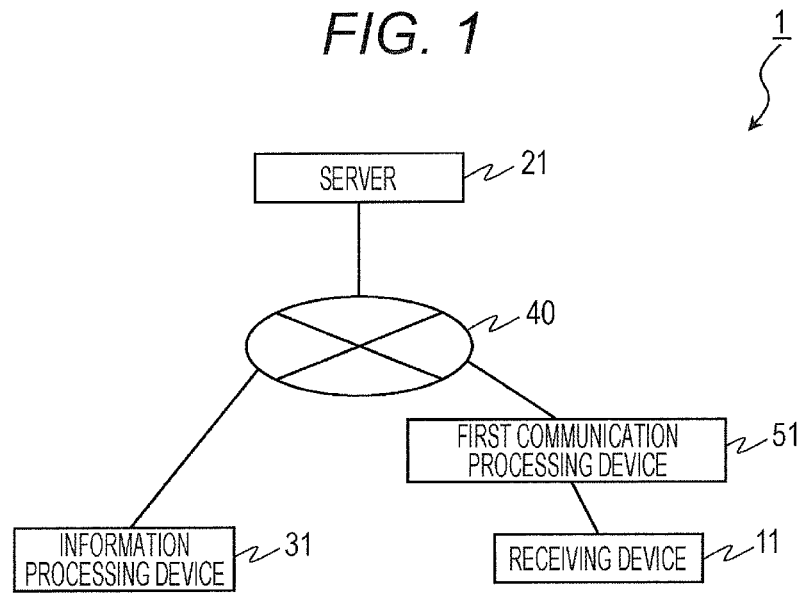
FIG. 1 is a diagram showing an example of a schematic configuration of a communication system in an exemplary embodiment.

FIG. 1 is a diagram showing an example of a schematic configuration of communication system 1 in this exemplary embodiment. In FIG. 1, communication system 1 includes: receiving device 11; server 21; information processing device 31; and first communication processing device 51.

Server 21, information processing device 31 and first communication processing device 51 are connected to communication network 40 via a wired or wireless communication line. Communication network 40 is, for example, the Internet. Moreover, receiving device 11 is connected to first communication processing device 51 via a wired or wireless communication channel.

First communication processing device 51 is a device (for example, a router, a firewall, a modem and the like) for connecting to communication network 40. That is, receiving device 11 is connected to communication network 40 via first communication processing device 51.

Information processing device 31 is connected to server 21 based on a first communication mode. Hereinafter, this connection that is based on the first communication mode is referred to as a first connection. Here, the first connection is established via communication network 40.

Moreover, information processing device 31 is connected to receiving device 11 based on a second communication mode. Hereinafter, this connection that is based on the second communication mode is referred to as a second connection. Here, the second connection is also established via communication network 40.

Note that a communication mode is a mode in which a procedure necessary to perform communication is determined. The communication mode is also called a communication architecture. For example, the communication mode is a client-server model, a P2P model and the like.

The first communication mode is a communication mode for performing the communication between information processing device 31 and server 21. The second communication mode is a communication mode different from the first communication mode, and is a communication mode for performing the communication between receiving device 11 and information processing device 31 without passing via server 21.

In this exemplary embodiment, an exemplary description is made of a case where the first communication mode is the client-server model, and where the second communication mode is the P2P model. That is, an exemplary description is made of a case where the first connection is a client-server connection, and where the second connection is a P2P connection.

Receiving device 11 is an example of a transfer device. Receiving device 11 transfers at least one content item out of one or more content items.

A content item refers to audio data, image data or video data, or an arbitrary combination of the audio data, the image data and the video data. For example, the content item is a broadcast program. Moreover, for example, the content item may be video audio data distributed in video-on-demand.

Here, receiving device 11 is a device capable of transferring the broadcast program. Specifically, for example, receiving device 11 is a hard disk recorder, a DVD recorder, a BD (Blu-ray (registered trademark) Disc) recorder, a television set, a set top box and the like.

Information processing device 31 is a device for reproducing the content item. Specifically, information processing device 31 receives a content item, which is selected from a content list displayed on a user interface, from receiving device 11. Then, information processing device 31 reproduces the content item received from receiving device 11. For example, information processing device 31 is a PC (Personal Computer), a portable terminal, a smart phone, a tablet computer and the like. An example of the user interface of information processing device 31 will be described later with reference to FIG. 3. Configurations of information processing device 31, server 21 and receiving device 11 will be described later in detail with reference to FIG. 4 to FIG. 8.

Figure 2:
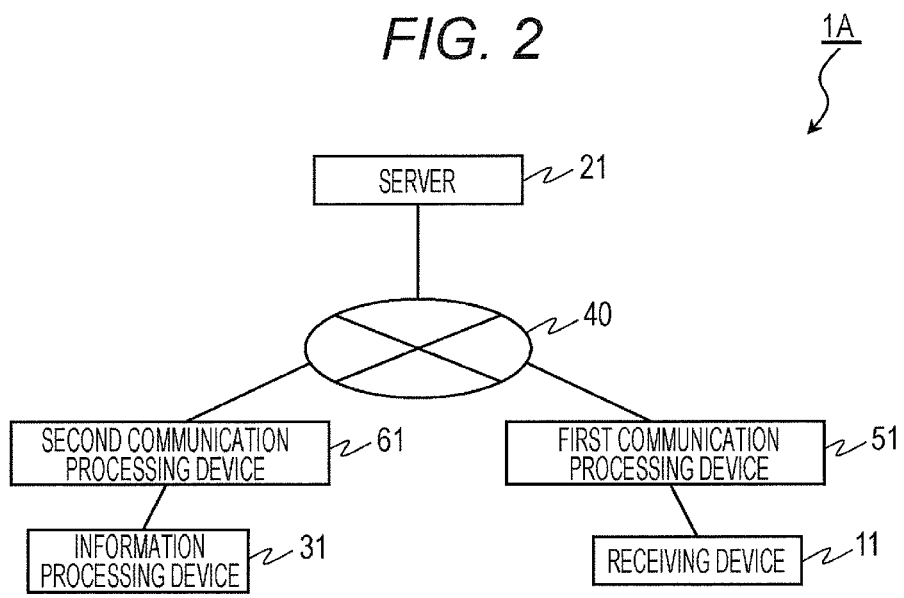
FIG. 2 is a diagram showing a modification example of the schematic configuration of the communication system in the exemplary embodiment.

FIG. 2 is a diagram showing a schematic configuration of communication system 1A in the exemplary embodiment. Communication system 1A is a modification example of communication system 1 of FIG. 1. Communication system 1A further includes second communication processing device 61. In communication system 1A, information processing device 31 is connected to communication network 40 via second communication processing device 61.

In this exemplary embodiment, there is no difference in effect regarding presence or absence of first communication processing device 51 and second communication processing device 61, and accordingly, a description of communication system 1A is omitted below.

Figure 3:
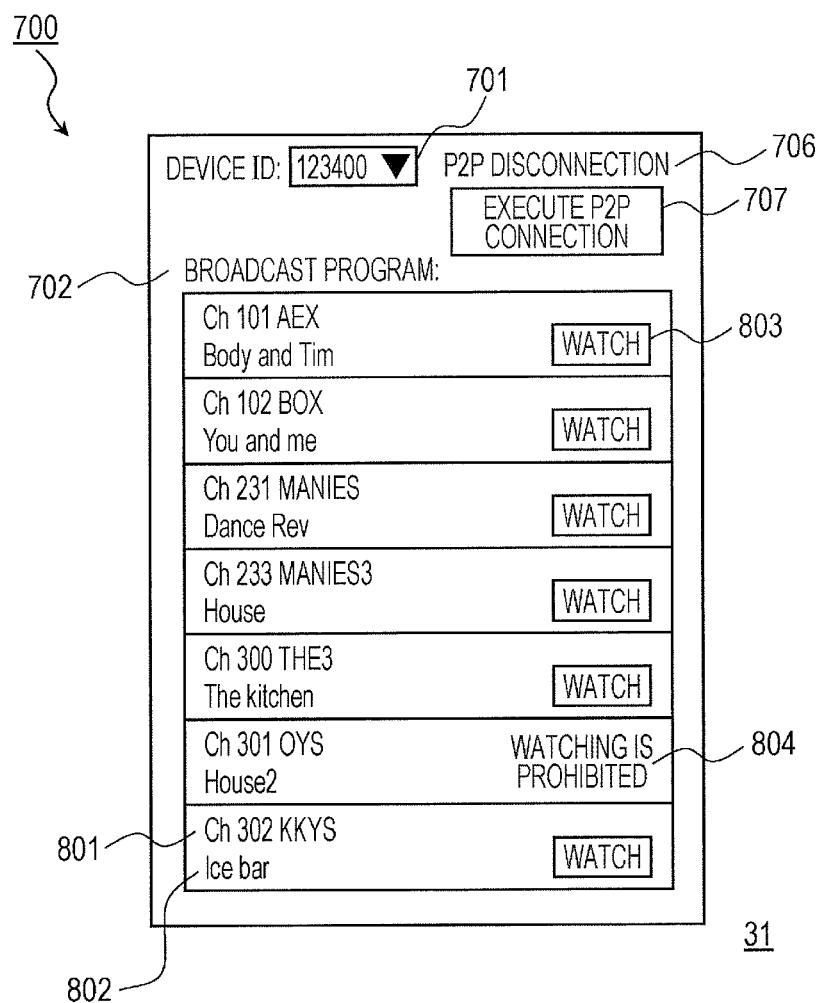
FIG. 3 is a diagram showing an example of a user interface of an information processing device according to the exemplary embodiment.

FIG. 3 is a diagram showing an example of user interface 700 which is provided to the user by information processing device 31. Here, a description is made of a case where the content item is a program under broadcast (hereinafter, referred to as a broadcast program).

User interface 700 is a graphical user interface. User interface 700 is displayed on a screen of information processing device 31, and is thereby provided to the user. Here, user interface 700 includes registered device list 701, program list 702, and P2P connection state display 706.

Registered device list 701 is a list of device IDs of one or more receiving devices. The user selects one of one or more device IDs included in registered device list 701, and thereby selects a receiving device (for example, receiving device 11) as an operation target out of the one or more receiving devices.

Note that, in registered device list 701, there may be included a device ID that corresponds to a network connection state and the like at timing when the user inputs an user ID to information processing device 31, or a device ID fixedly preset in information processing device 31. Moreover, the list of the device IDs may be received from server 21 and the like via communication network 40, or may be input through a recording medium such as a CD-ROM, and a method for obtaining the list of the device IDs is arbitrary. Moreover, in registered device list 701, product numbers of the devices or nicknames of the devices, which are managed in server 21 in association with the device IDs, may be included in place of the device IDs.

Program list 702 is a list of broadcast programs, and is also a list of broadcast stations. In program list 702, there are listed channel/broadcast station names 801 and program names 802 of broadcast programs receivable by receiving device 11 with a device ID "123400", which is selected by registered device list 701. Then, broadcast station selection buttons 803 are added to each of the broadcast programs. Broadcast station selection button 803 is not added to a broadcast program of a broadcast station which is set to be prohibited from being watched, and broadcast station selection prohibition display 804 is displayed thereon. The broadcast program on which broadcast station selection prohibition display 804 is displayed cannot be selected.

Each of broadcast station selection buttons 803 is a button for instructing receiving device 11 to transfer the broadcast program of the selected channel.

P2P connection state display 706 is a mark that indicates whether or not the P2P connection is established between information processing device 31 and receiving device 11. In a case where the P2P connection between information processing device 31 and receiving device 11 is not established, P2P connection execution button 707 is pressed, whereby processing for establishing the P2P connection is executed.

Note that the P2P connection between information processing device 31 and receiving device 11 may be established in such a manner that information processing device 31 and receiving device 11 communicate directly with each other via communication network 40, or may be established in such a manner that server 21 mediates therebetween, and means for establishment of the connection is arbitrary.

[1-1-2. Configuration of Information Processing Device]

Figure 4:
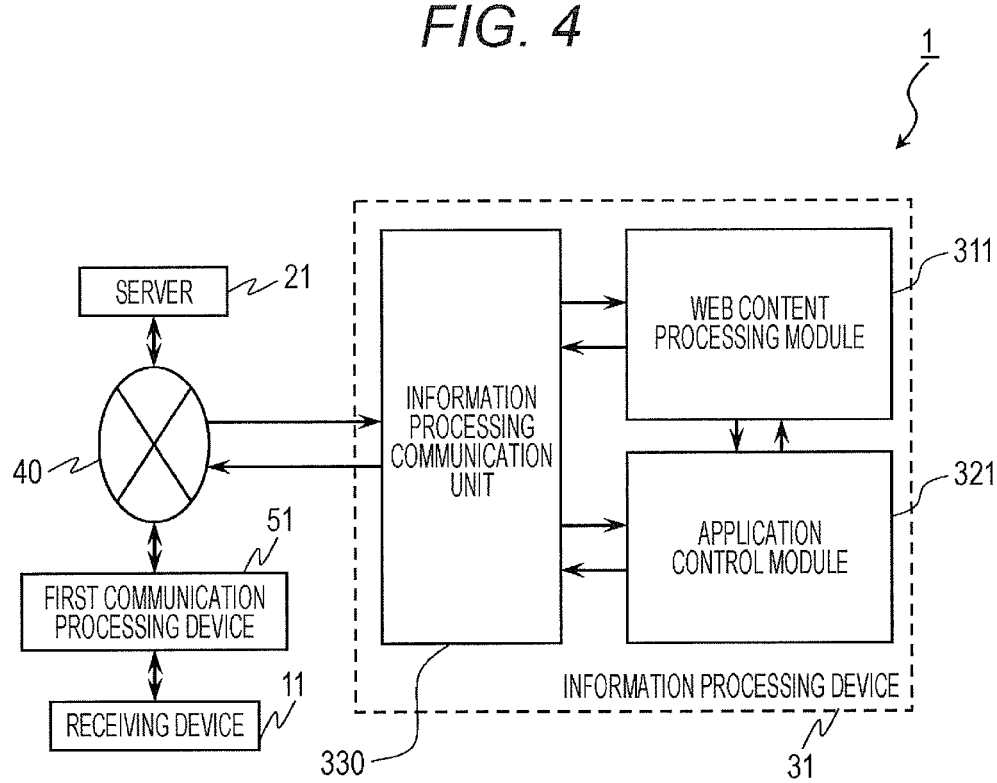
FIG. 4 is a block diagram showing an example of a configuration of the information processing device according to the exemplary embodiment.

FIG. 4 is a block diagram showing an example of a configuration of information processing device 31. In FIG. 4, information processing device 31 includes: WEB content processing module 311; application control module 321; and information processing communication unit 330.

WEB content processing module 311 performs the communication with server 21 via information processing communication unit 330, and processes and displays HTML (Hyper Text Markup Language) content received from server 21. Then, WEB content processing module 311 transmits operation content of the user for the displayed HTML content to application control module 321. Specifically, WEB content processing module 311 performs, for example, an inter-socket communication with application control module 321. Moreover, for example, WEB content processing module 311 may treat application control module 321 as a library, and may communicate with application control module 321 by directly calling out a function included in the library.

Moreover, WEB content processing module 311 receives a processing result of application control module 321. Specifically, for example, application control module 321 calls a callback function of a Java (registered trademark) script of WEB content processing module 311, and thereby transmits the processing result to WEB content processing module 311. Moreover, for example, application control module 321 may transmit the processing result to WEB content processing module 311 by the inter-socket communication. Furthermore, for example, application control module 321 may treat WEB content processing module 311 as a library, and may transmit the processing result to WEB content processing module 311 by directly calling out a function included in the library.

Through the P2P connection, application control module 321 performs the communication with receiving device 11 via information processing communication unit 330, and thereby receives the content item from receiving device 11. Moreover, application control module 321 reproduces the received content item.

Moreover, application control module 321 can perform the communication with WEB content processing module 311. A communication method is the same as the method mentioned above, and accordingly, a description thereof is omitted.

Note that information processing device 31 communicates with server 21 or receiving device 11 via information processing communication unit 330. Information processing communication unit 330 is an interface for connecting to communication network 40, and for example, is a modem, an interface card, and a wired/wireless LAN (Local Area Network) module. In this exemplary embodiment, information processing communication unit 330 communicates with server 21 through the client-server connection, and communicates with receiving device 11 through the P2P connection.

Figure 5:
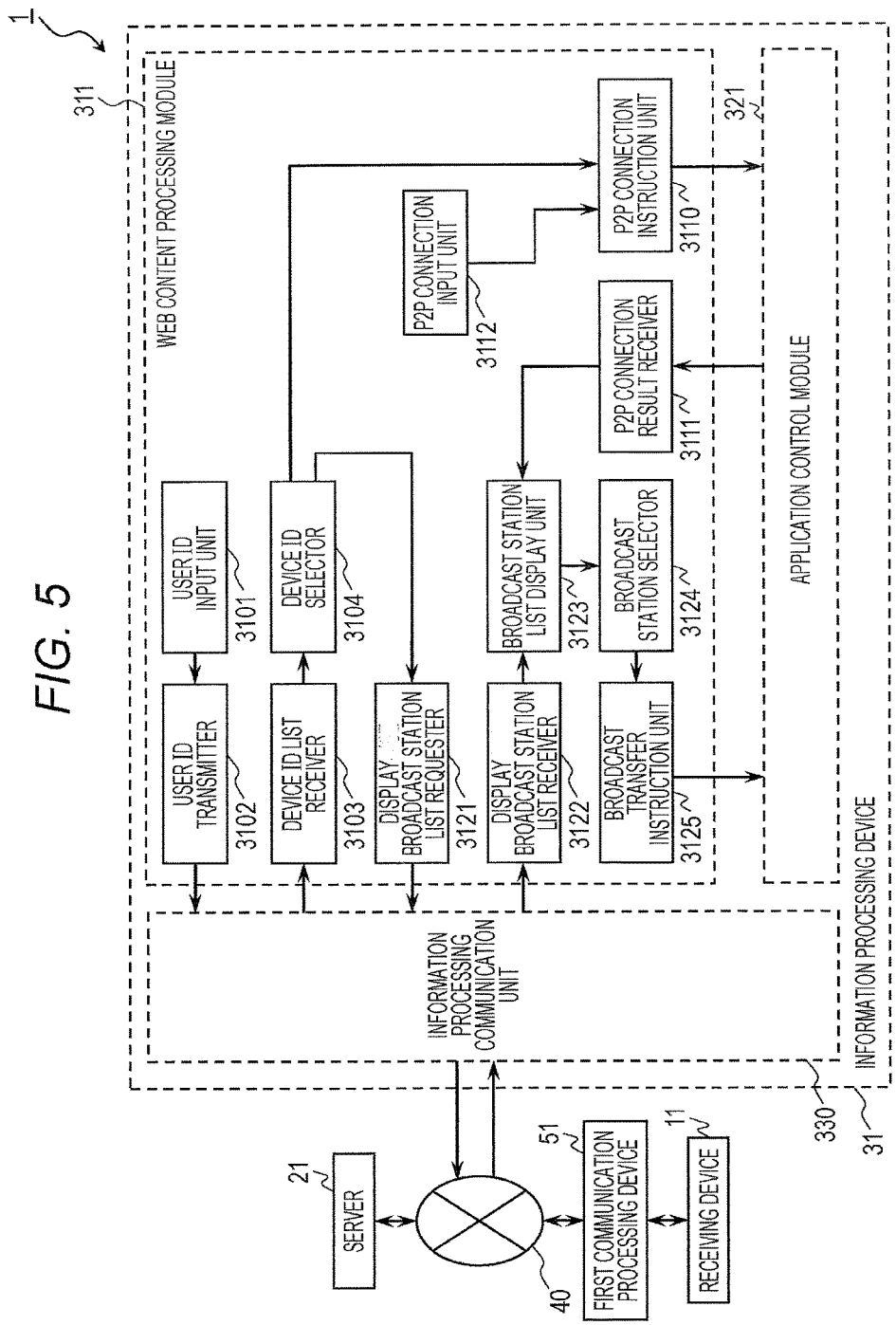
FIG. 5 is a block diagram showing an example of an internal configuration of a WEB content processing module included in the information processing device according to the exemplary embodiment.

FIG. 5 is a block diagram showing an example of a configuration of WEB content processing module 311 of information processing device 31. In FIG. 5, WEB content processing module 311 includes: user ID input unit 3101; user ID transmitter 3102; device ID list receiver 3103;

device ID selector 3104; display broadcast station list requester 3121; display broadcast station list receiver 3122; broadcast station list display unit 3123; broadcast station selector 3124; broadcast transfer instruction unit 3125; P2P connection instruction unit 3110; P2P connection result receiver 3111; and P2P connection input unit 3112.

In order to receive a device ID list, which is registered by the user, in device ID list receiver 3103, user ID input unit 3101 accepts, from the user, an input of the user ID for making a request for the device ID list to server 21. Then, user ID input unit 3101 outputs the user ID, which is input by the user, to user ID transmitter 3102. Note that user ID input unit 3101 may accept an input of a password in addition to the user ID, and may output the user ID and the password together to user ID transmitter 3102.

User ID transmitter 3102 transmits the user ID, which is input from user ID input unit 3101, to server 21 through communication network 40. Note that, in a case where the password is acquired in addition to the user ID from user ID input unit 3101, user ID transmitter 3102 may transmit the user ID and the password together to server 21.

Device ID list receiver 3103 receives the device ID list transmitted from server 21 through communication network 40. The device ID list is a list which includes device IDs of one or more receiving devices registered in association with the user IDs transmitted from user ID transmitter 3102. Note that, in a case where the device IDs are not associated with the user IDs, the device IDs may not be included in the device ID list. Moreover, the device IDs may not be the device IDs themselves recorded in the receiving devices, and each of the device IDs may by any ID as long as the ID can uniquely specify the receiving device.

Device ID selector 3104 selects one device ID from the device ID list input from device ID list receiver 3103. Then, device ID selector 3104 outputs the selected device ID to display broadcast station list requester 3121. In a case where two or more device IDs are included in the device ID list, device ID selector 3104 may select one device ID through the user interface such as registered device list 701 illustrated in FIG. 3, or may automatically select one device ID set as a default. Moreover, device ID selector 3104 issues an instruction on the P2P connection to P2P connection instruction unit 3110 in order to establish the P2P connection between information processing device 31 and receiving device 11.

Based on the device ID input from device ID selector 3104, display broadcast station list requester 3121 transmits a display broadcast station list request signal, which requests a broadcast station list as a list of one or more broadcast stations, which are receivable by receiving device 11, via information processing communication unit 330 through communication network 40 to server 21. The display broadcast station list request signal includes the device ID input from device ID selector 3104.

Note that the broadcast station list is an example of a content list as a list of one or more content items. The broadcast stations correspond to the broadcast programs. That is, the broadcast station list corresponds to a list of one or more broadcast programs.

Display broadcast station list receiver 3122 is an example of a display information receiver. Display broadcast station list receiver 3122 receives display broadcast station list information, which serves for displaying the broadcast station list (for example, program list 702) on at least the user interface, from server 21 through the client-server connection. This display broadcast station list information is an example of display information. That is, display broadcast station list receiver 3122 receives the display information, which serves for displaying the content list as the list of the one or more content items, which is receivable by receiving device 11, from server 21 through the first connection that is based on the first communication mode. The received display broadcast station list information is output to broadcast station list display unit 3123.

Broadcast station list display unit 3123 displays all or a part of the display broadcast station list information input from display broadcast station list receiver 3122, on the user interface of FIG. 3.

Broadcast station selector 3124 is an example of a content selector. In accordance with the operation of the user, broadcast station selector 3124 selects at least one broadcast station shown in the display broadcast station list information displayed on broadcast station list display unit 3123. That is, based on the display information, broadcast station selector 3124 selects at least one content item out of the one or more content items receivable by receiving device 11. Then, broadcast station selector 3124 outputs a broadcast station identification ID, which identifies the selected broadcast station, to broadcast transfer instruction unit 3125.

Note that a selection method of the broadcast station is not limited to a specific method. For example, the broadcast station may be selected in such a manner that the user pushes broadcast station selection button 803 illustrated in FIG. 3. Furthermore, for example, a broadcast station, which is broadcasting a broadcast program including a keyword preset by the user, may be automatically selected. Moreover, for example, a broadcast station, which is broadcasting a broadcast program designated from other application of information processing device 31, may be selected. Furthermore, for example, a broadcast station, which is broadcasting a broadcast program recommended by information processing device 31, may be automatically selected.

Moreover, the broadcast station identification ID may be any ID as long as the ID is information by which receiving device 11 can identify the broadcast station. For example, the broadcast station identification ID may be a combination of a network ID (networkid), a transform ID (tsid) and a service ID (serviceid), which are determined by the broadcast station. Moreover, for example, the broadcast station identification ID may be a channel number. Furthermore, for example, the broadcast station identification ID may be a broadcast station name. Moreover, for example, the broadcast station identification ID may be an ID imparted to each of the broadcast stations by receiving device 11. Furthermore, for example, the broadcast station identification ID may be an ID determined by server 21 and information processing device 31 in accordance with a common rule. Moreover, for example, the broadcast station identification ID may be an ID which is arbitrarily determined for each of the broadcast stations by receiving device 11.

Moreover, like the broadcast station in which broadcast station selection prohibition display 804 is displayed as illustrated in FIG. 3, the broadcast station, which is prohibited from transferring the broadcast program, is managed by a list of broadcast transfer-prohibited broadcast stations, which is illustrated in FIG. 10. In a case where the broadcast station is included in the list of the broadcast transfer-prohibited broadcast stations, broadcast station selection prohibition display 804 may be displayed on each of the broadcast stations.

Whether or not the broadcast station is included in the list of the broadcast transfer-prohibited broadcast stations may be determined by the combination of the network ID (networkid), the transform ID (tsid) and the service ID (serviceid), or by a coincidence or partial coincidence of the broadcast station name. Note that the list of the broadcast transfer-prohibited broadcast stations may be received from receiving device 11 or server 21, or may be stored in information processing device 31.

Broadcast transfer instruction unit 3125 transmits the broadcast station identification ID, which is input from broadcast station selector 3124, as a broadcast transfer instruction signal to broadcast transfer instruction receiver 3221 included in application control module 321.

Based on a P2P connection instruction from device ID selector 3104, P2P connection instruction unit 3110 transmits a P2P connection instruction signal to P2P connection instruction receiver 3205 of application control module 321. Note that receiving device 11 may determine whether or not the P2P connection to the device selected by device ID selector 3104 is already established. In this case, only when it is determined that the P2P connection is not still established (that is, the P2P connection is disconnected), P2P connection instruction unit 3110 may transmit the P2P connection instruction signal to P2P connection instruction receiver 3205 included in application control module 321.

Moreover, the P2P connection instruction is sometimes performed by P2P connection input unit 3112. This is a case where P2P connection execution button 707 of FIG. 3 is pushed by the user operation. Note that, at the time of sensing the disconnection of the P2P connection, information processing device 31 may automatically perform the P2P connection instruction.

P2P connection result receiver 3111 transmits P2P connection result information, which is received from P2P connection result transmitter 3207 included in application control module 321, to broadcast station list display unit 3123. The P2P connection result information is, for example, "P2P connection failure", "under P2P connection", "P2P connection success", and the like. At the time of "P2P connection failure", the P2P connection result information may include an error code. In this manner, broadcast station list display unit 3123 can display a state such as "P2P disconnection" and "under P2P connection" on P2P connection state display 706 of the user interface of FIG. 3.

Figure 6:
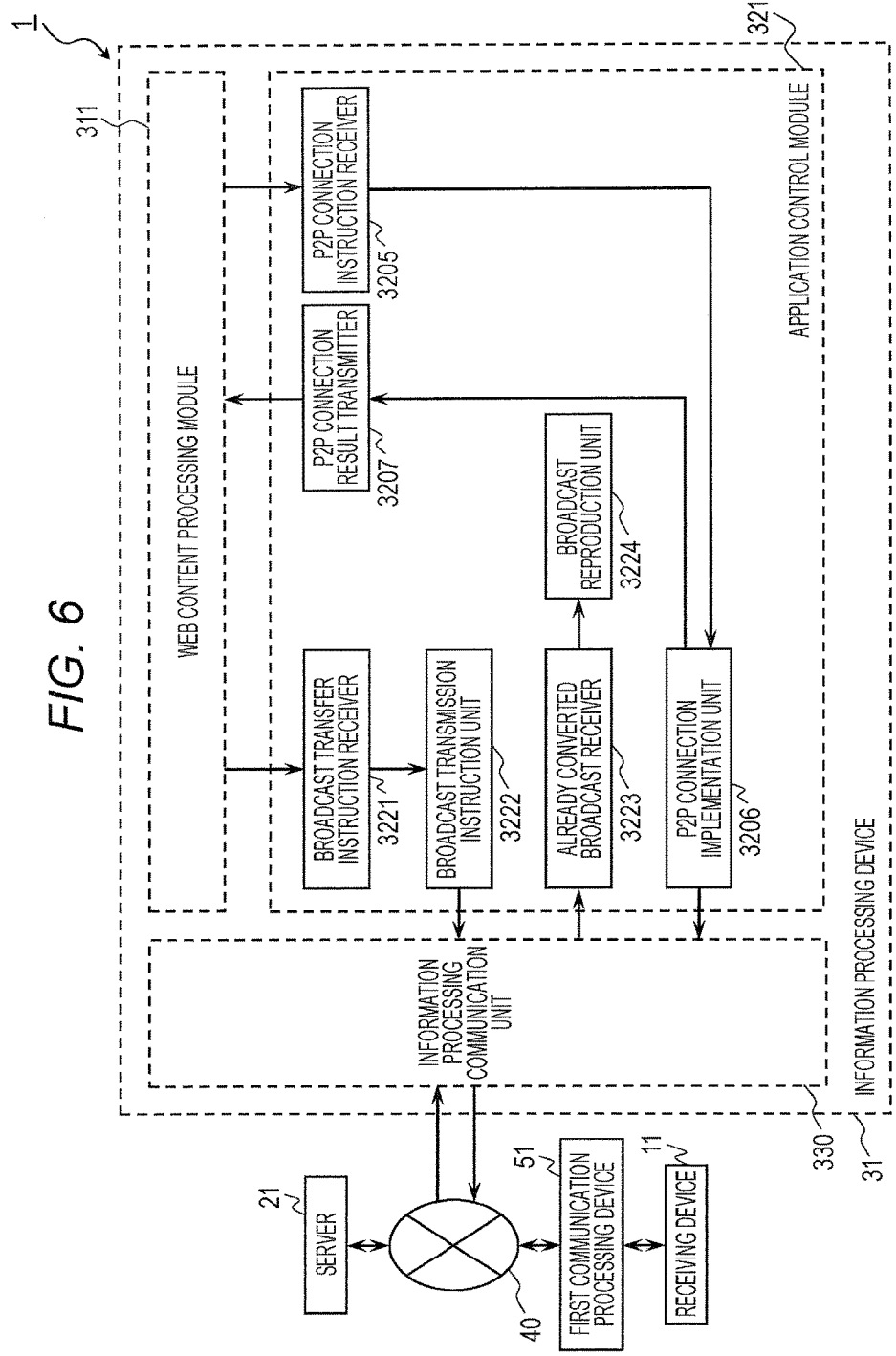
FIG. 6 is a block diagram showing an example of an internal configuration of an application control module included in the information processing device according to the exemplary embodiment.

FIG. 6 is a block diagram showing a configuration of application control module 321 of information processing device 31. In FIG. 6, application control module 321 includes: broadcast transfer instruction receiver 3221; broadcast transmission instruction unit 3222; already converted broadcast receiver 3223; broadcast reproduction unit 3224; P2P connection instruction receiver 3205; P2P connection implementation unit 3206; and P2P connection result transmitter 3207.

Broadcast transfer instruction receiver 3221 receives the broadcast transfer instruction signal from broadcast transfer instruction unit 3125 included in WEB content processing module 311, and instructs broadcast transmission instruction unit 3222 to transfer the broadcast program.

Based on the instruction from broadcast transfer instruction receiver 3221, broadcast transmission instruction unit 3222 transmits a broadcast program transmission instruction signal, which includes at least the broadcast station identification ID, via information processing communication unit 330 to receiving device 11 through communication network 40. At this time, the broadcast program transmission instruction signal is transmitted through the P2P connection. Note that, in a case where the P2P connection is not established between receiving device 11 and information processing device 31, a warning indicating the P2P disconnection may be displayed on the user interface of FIG. 3, or a notice for prompting the user to establish the P2P connection may be issued, or processing for establishing the P2P connection may be automatically performed.

Already converted broadcast receiver 3223 is an example of a content receiver. Already converted broadcast receiver 3223 receives the broadcast program from receiving device 11, and instructs broadcast reproduction unit 3224 to reproduce the received broadcast program. That is, already converted broadcast receiver 3223 receives the broadcast program, which is broadcasted from the broadcast station selected by broadcast station selector 3124, from receiving device 11 through the P2P connection established by P2P connection implementation unit 3206 to be described later.

Broadcast reproduction unit 3224 reproduces the broadcast program received from already converted broadcast receiver 3223. Broadcast reproduction unit 3224 may close the user interface of FIG. 3 and reproduce the broadcast program on the full screen, or may reproduce the broadcast program on a partial region of the user interface.

Note that already converted broadcast receiver 3223 converts a received broadcast signal, and outputs the converted broadcast signal to broadcast reproduction unit 3224. Then, broadcast reproduction unit 3224 reproduces the broadcast program by using a conversion result of the broadcast signal, which is made by already converted broadcast receiver 3223.

P2P connection instruction receiver 3205 receives the P2P connection instruction signal transmitted from P2P connection instruction unit 3110 included in WEB content processing module 311, and makes a request to P2P connection implementation unit 3206 to establish the P2P connection.

P2P connection implementation unit 3206 is an example of a communication establishment unit. Based on a request from P2P connection instruction receiver 3205, P2P connection implementation unit 3206 transmits a P2P connection request signal via information processing communication unit 330 to receiving device 11 through communication network 40, and establishes the P2P connection between receiving device 11 and information processing device 31. That is, P2P connection implementation unit 3206 establishes the P2P connection between receiving device 11 and information processing device 31.

In a case where the P2P connection is already established between information processing device 31 and receiving device 11, P2P connection implementation unit 3206 may transmit a response, which indicates "P2P connection success" and "under P2P connection", to P2P connection result transmitter 3207 without transmitting the P2P connection request signal to receiving device 11. Note that the P2P connection request signal may be transmitted from information processing device 31 via server 21 to receiving device 11, and a route of the transmission is arbitrary. Moreover, the P2P connection result is transmitted from P2P connection implementation unit 3206 to P2P connection result transmitter 3207.

P2P connection result transmitter 3207 transmits the P2P connection result information, which is based on the P2P connection result received from P2P connection implementation unit 3206, to P2P connection result receiver 3111 included in WEB content processing module 311.

[1-1-3. Configuration of Server]

Figure 7:
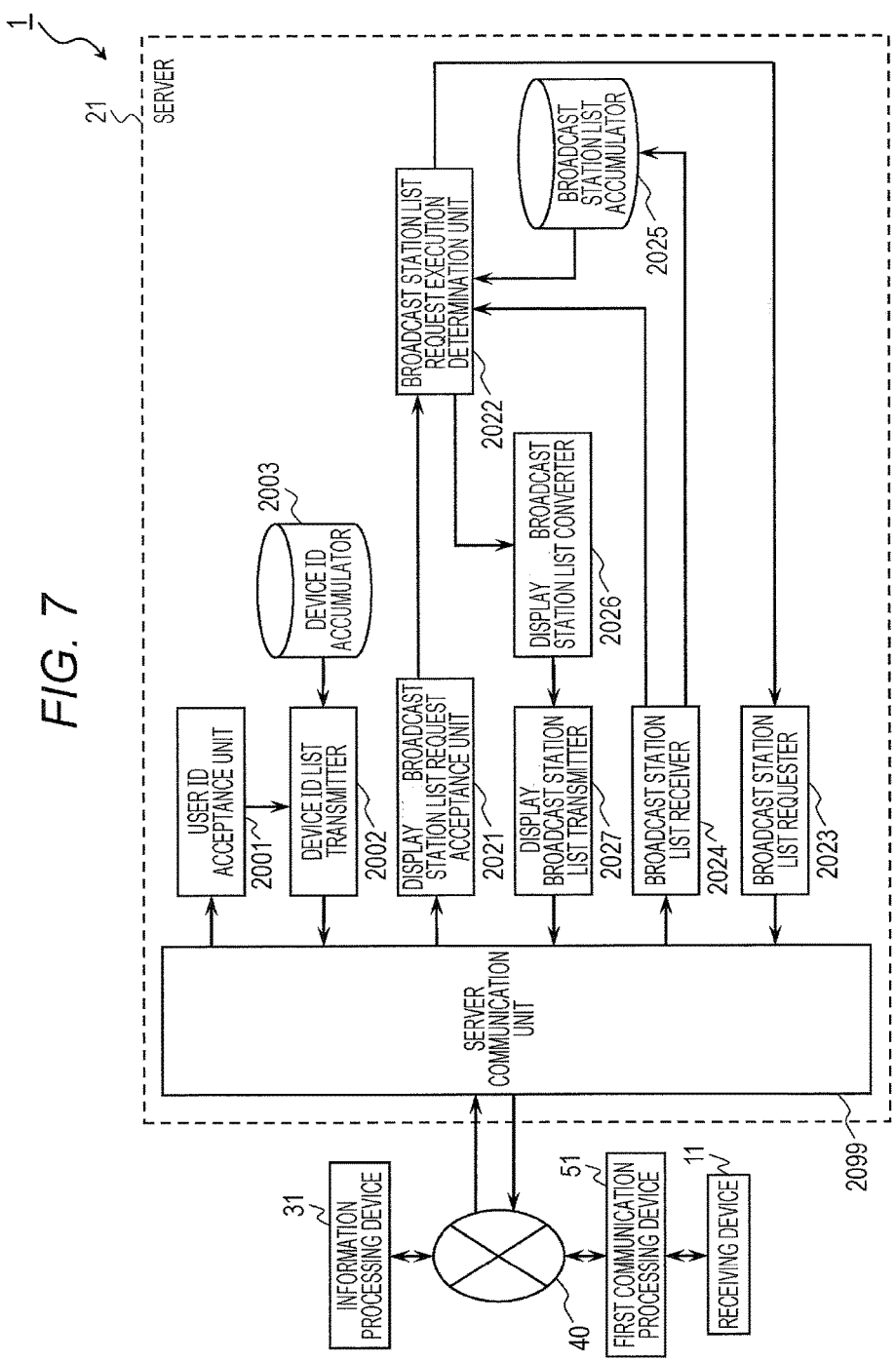
FIG. 7 is a block diagram showing an example of a configuration of a server according to the exemplary embodiment.

FIG. 7 is a block diagram showing an example of a configuration of server 21. In FIG. 7, server 21 includes: user ID acceptance unit 2001; device ID list transmitter 2002; device ID accumulator 2003; display broadcast station list request acceptance unit 2021; broadcast station list request execution determination unit 2022; broadcast station list requester 2023; broadcast station list receiver 2024; broadcast station list accumulator 2025; display broadcast station list converter 2026; display broadcast station list transmitter 2027; and server communication unit 2099.

User ID acceptance unit 2001 receives the user ID transmitted from information processing device 31 through communication network 40. Then, user ID acceptance unit 2001 confirms validity of the user ID, and outputs the valid user ID to device ID list transmitter 2002. The confirmation of the validity of the user ID is performed by confirmation of a coincidence with the user ID registered in advance and by confirmation using the user ID and a password.

Device ID list transmitter 2002 acquires the device ID list, which is associated with the user ID input from user ID acceptance unit 2001, from device ID accumulator 2003. Then, device ID list transmitter 2002 transmits the acquired device ID list to information processing device 31 through communication network 40.

Device ID accumulator 2003 accumulates the device ID list in association with each of a plurality of the user IDs. Here, the registration of the device ID into the device ID list accumulated in device ID accumulator 2003 may be performed by the user, for example, after the user logs into server 21 from information processing device 31 by using the user ID. Moreover, the device ID may be registered in the device ID list by using registration means for the device ID, which is carried out in a general web service.

Display broadcast station list request acceptance unit 2021 receives the display broadcast station list request signal from information processing device 31 through communication network 40. Then, display broadcast station list request acceptance unit 2021 outputs the device ID and the like, which are included in the display broadcast station list request signal, to broadcast station list request execution determination unit 2022.

Broadcast station list request execution determination unit 2022 confirms whether or not the broadcast station list corresponding to the device ID and the like, which are input from display broadcast station list request acceptance unit 2021, is already accumulated in broadcast station list accumulator 2025. In a case where the broadcast station list corresponding to the device ID and the like, which are input from display broadcast station list request acceptance unit 2021, is accumulated, broadcast station list request execution determination unit 2022 acquires this broadcast station list from broadcast station list accumulator 2025, and outputs the broadcast station list to display broadcast station list converter 2026.

Meanwhile, in a case where the broadcast station list corresponding to the device ID and the like, which are input from display broadcast station list request acceptance unit 2021, is not accumulated, broadcast station list request execution determination unit 2022 outputs a broadcast station list request, which includes the device ID and the like, to broadcast station list requester 2023.

Then, broadcast station list requester 2023 transmits the broadcast station list request signal to the device corresponding to the device ID. Thereafter, when a broadcast station list acquisition completion notice, which indicates that the broadcast station list is acquired, is input in broadcast station list receiver 2024, broadcast station list requester 2023 acquires the broadcast station list corresponding to the device ID and the like, which are input from display broadcast station list request acceptance unit 2021, from broadcast station list accumulator 2025, and outputs the acquired broadcast station list to display broadcast station list converter 2026.

Note that, in a case where a predetermined time has elapsed since the broadcast station list is accumulated, broadcast station list request execution determination unit 2022 may output a broadcast station list request, which requests only a difference from a previously acquired broadcast station list (that is, the broadcast station list accumulated in broadcast station list accumulator 2025), to broadcast station list requester 2023, or may output a broadcast station list request, which is to acquire the whole broadcast station list one more time, to broadcast station list requester 2023.

Broadcast station list requester 2023 transmits the broadcast station list request signal to receiving device 11 through communication network 40 in order to acquire the broadcast station list corresponding to the device ID included in the broadcast station list request input from broadcast station list request execution determination unit 2022. Note that broadcast station list requester 2023 may make the broadcast station list request once, or may make the broadcast station list request a number of times necessary for each predetermined number of broadcast stations.

Broadcast station list receiver 2024 is an example of a content list receiver that receives a content list from receiving device 11. Broadcast station list receiver 2024 receives the broadcast station list from receiving device 11, which corresponds to the input device ID, through communication network 40. Then, broadcast station list receiver 2024 accumulates the broadcast station list in broadcast station list accumulator 2025, and outputs the broadcast station list acquisition completion notice, which indicates that the broadcast station list has been able to be acquired, to broadcast station list request execution determination unit 2022.

The broadcast station list includes: channels; broadcast station names; and IDs such as the network ID (networkid), the transform ID (tsid) and the service ID (serviceid), each of which is for identifying the broadcast program. The broadcast station list may include information other than these pieces of the information.

Note that, in a case where broadcast station list requester 2023 makes a broadcast station list acquisition request a plurality of times, broadcast station list receiver 2024 may output the broadcast station list acquisition completion notice to broadcast station list request execution determination unit 2022 at a point of time when all of the broadcast station lists have been received.

Here, with reference to FIG. 9, a description is made of an example of data accumulated in broadcast station list accumulator 2025. In broadcast station list accumulator 2025, the broadcast station list is accumulated in a table format. The broadcast station list may include: "device ID" column 191; "channel (ch)" column 192; "network ID (networkid)" column 193; "transform ID (tsid)" column 194; "service ID (serviceid)" column 195; "broadcast station name" column 196; and "update date and time" column 197. Moreover, information on a service that is not used may not be included in the broadcast station list. The broadcast station name may be a character string indicating the name of the broadcast station, or may be an ID capable of uniquely identifying the broadcast station.

Note that server 21 may not include broadcast station list request execution determination unit 2022 and broadcast station list accumulator 2025. In this case, display broadcast station list request acceptance unit 2021 directly outputs a broadcast station list acquisition request signal for requesting the acquisition of the broadcast station list to broadcast station list requester 2023. Then, broadcast station list receiver 2024 directly outputs the received broadcast station list to display broadcast station list converter 2026.

Display broadcast station list converter 2026 is an example of a display information converter that converts the content list into display information. In a case where the broadcast station list is input from broadcast station list request execution determination unit 2022, display broadcast station list converter 2026 converts the input broadcast station list into display information with a format capable of being displayed by information processing device 31, and outputs the display information as a display broadcast station list to display broadcast station list transmitter 2027.

The display information may be information for a browser. In this case, the display information may include information for controlling an expression format of the broadcast station list. The information for controlling the expression format is represented, for example, by HTML-Java (registered trademark) Script, CSS (Cascading Style Sheets) and the like.

Moreover, for example, the display information may be information for an application. In this case, the display information is represented, for example, by SOAP (Simple Object Access Protocol), XML (Extensible Markup Language) and the like.

Display broadcast station list transmitter 2027 transmits a display broadcast station list, which is input from display broadcast station list converter 2026, to information processing device 31 via server communication unit 2099 through communication network 40.

Server communication unit 2099 is an interface for connecting to communication network 40, and for example, is a modem, an interface card, or a wired/wireless LAN module. For example, server communication unit 2099 communicates with information processing device 31 through the client-server connection.

[1-1-4. Configuration of Receiving Device]

Figure 8:
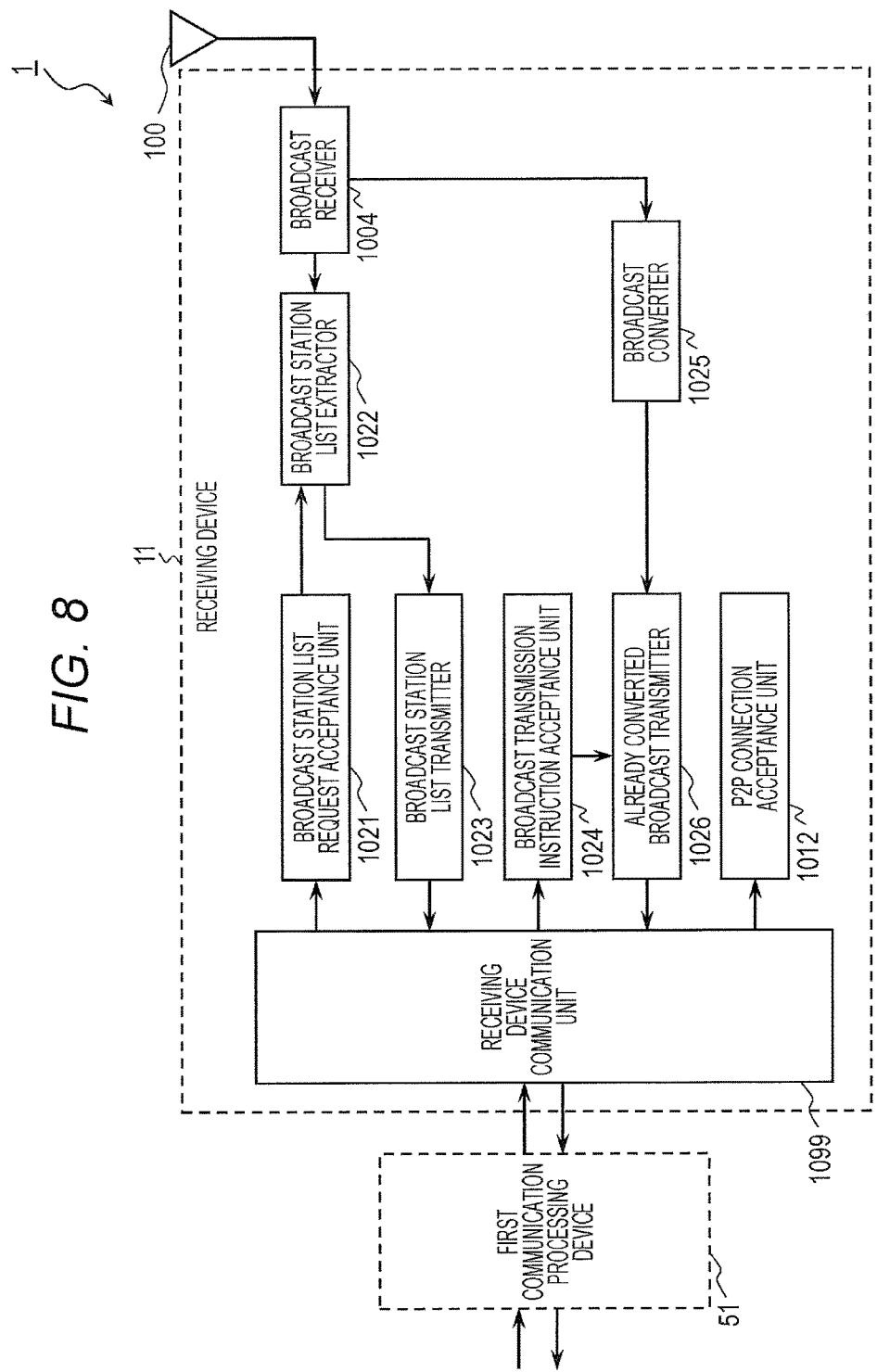
FIG. 8 is a block diagram showing an example of a configuration of a receiving device according to the exemplary embodiment.

FIG. 8 is a block diagram showing an example of a configuration of receiving device 11. In FIG. 8, receiving device 11 includes: broadcast receiver 1004; P2P connection acceptance unit 1012; broadcast station list request acceptance unit 1021; broadcast station list extractor 1022; broadcast station list transmitter 1023; broadcast transmission instruction acceptance unit 1024; broadcast converter 1025; already converted broadcast transmitter 1026; and receiving device communication unit 1099.

Broadcast receiver 1004 is a tuner for receiving a broadcast wave, which is received by antenna 100, by receiving device 11. Broadcast receiver 1004 receives the broadcast wave, and outputs the received broadcast wave to broadcast converter 1025.

Through communication network 40 and first communication processing device 51, broadcast station list request acceptance unit 1021 receives the broadcast station list request signal from server 21 via receiving device communication unit 1099, and makes a request for the broadcast station list to broadcast station list extractor 1022.

In accordance with the request for the broadcast station list from broadcast station list request acceptance unit 1021, broadcast station list extractor 1022 extracts the broadcast station list included in the broadcast wave received by broadcast receiver 1004. The broadcast station list includes: the channel; the broadcast station name; and the ID such as networkid, tsid and serviceid, each of which is for identifying the program. Moreover, the information on the not-used service may not be extracted. The broadcast station name may be a character string indicating the name of the broadcast station, or may be an ID capable of uniquely identifying the broadcast station.

Broadcast station list transmitter 1023 transmits the broadcast station list, which is extracted by broadcast station list extractor 1022, to server 21 via receiving device communication unit 1099 through first communication processing device 51 and communication network 40. Note that, at the time of transmitting the broadcast station list to server 21, broadcast station list transmitter 1023 may convert the broadcast station list into a format determined between receiving device 11 and server 21. As the format determined between receiving device 11 and server 21, for example, CSV (Comma Separated Values), SOAP, XML, JSON (JavaScript (registered trademark) Object Notation) and the like are used.

Broadcast transmission instruction acceptance unit 1024 receives the broadcast program transmission instruction signal from information processing device 31 through communication network 40 and first communication processing device 51 via receiving device communication unit 1099. Then, broadcast transmission instruction acceptance unit 1024 instructs already converted broadcast transmitter 1026 to transmit the broadcast program (content item) corresponding to the broadcast station identification ID included in the broadcast program transmission instruction signal.

Broadcast converter 1025 converts the broadcast wave, which is received from broadcast receiver 1004, into data with a format communicable in communication network 40. For example, broadcast converter 1025 converts the broadcast wave into IP (Internet Protocol) packets.

Already converted broadcast transmitter 1026 receives from broadcast converter 1025 the broadcast program, which corresponds to the broadcast station identification ID transmitted from broadcast transmission instruction acceptance unit 1024, and transmits the received broadcast program to information processing device 31 via receiving device communication unit 1099 through first communication processing device 51 and communication network 40. The broadcast program (content item) is transmitted to information processing device 31 by the communication made by the P2P connection.

P2P connection acceptance unit 1012 receives the P2P connection request signal from information processing device 31 through communication network 40 and first communication processing device 51 via receiving device communication unit 1099. Then, P2P connection acceptance unit 1012 establishes the P2P connection between receiving device 11 and information processing device 31.

Receiving device communication unit 1099 is an interface for connecting to first communication processing device 51, and for example, is a modem, an interface card, or a wired/wireless LAN module.

[1-2. Operations]

With regard to communication system 1 configured as described above, an example of operations of communication system 1 is described with reference to FIG. 11 to FIG. 14. FIG. 11 to FIG. 14 describe processing in which the user logs in, information processing device 31 and receiving device 11 perform the P2P connection, and the user selects the broadcast station from the broadcast station list, and reproduces the broadcast program.

[1-2-1. Broadcast Station List Display/P2P Connection Processing]

Figure 11:
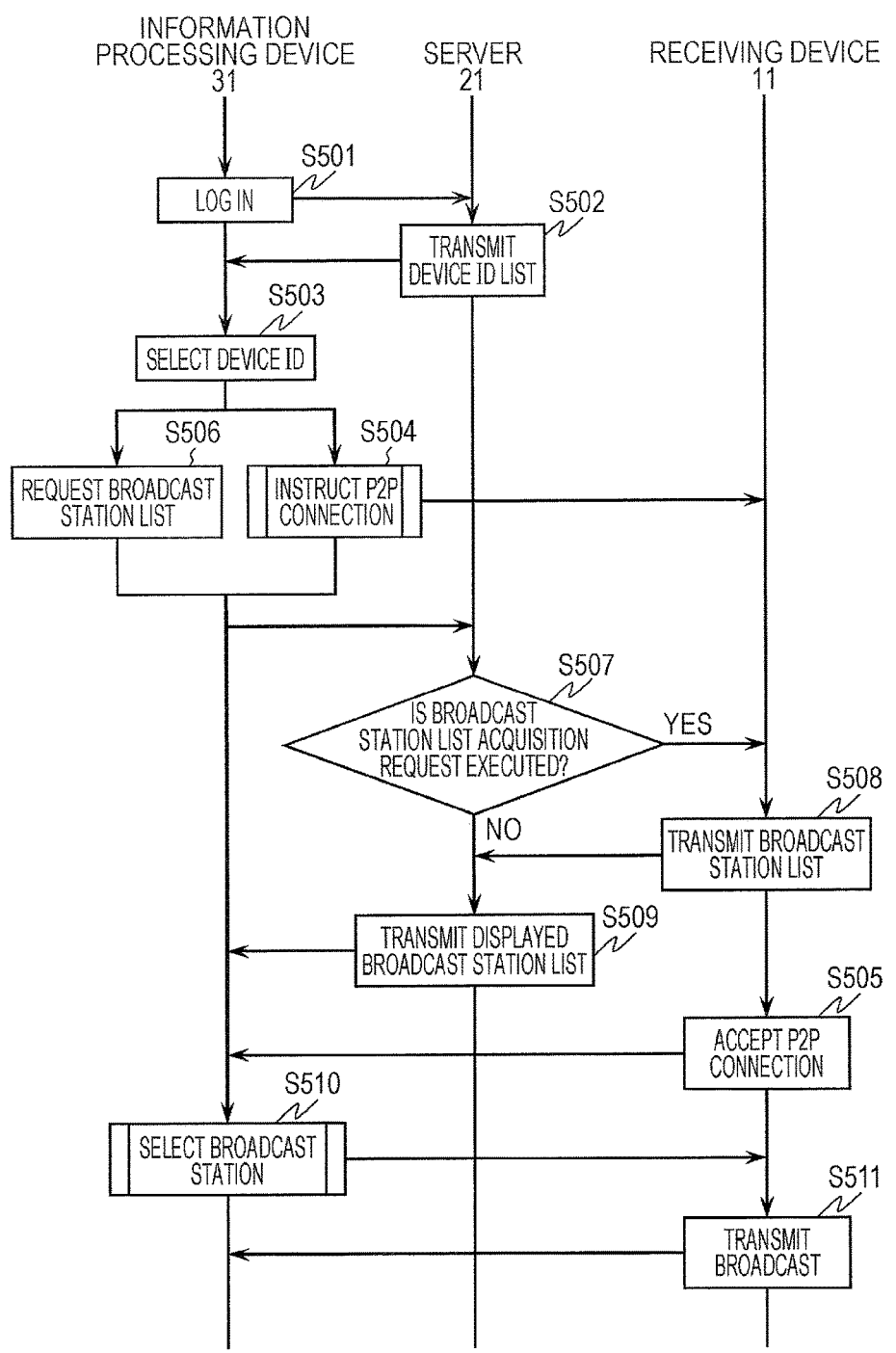
FIG. 11 is a diagram showing an example of a flowchart of processing for displaying the broadcast station list on the information processing device in the exemplary embodiment.

With reference to FIG. 11, a description is made of processing until the broadcast station list is displayed on information processing device 31 in communication system 1 and the reproduction of the broadcast program is executed.

Figure 12:
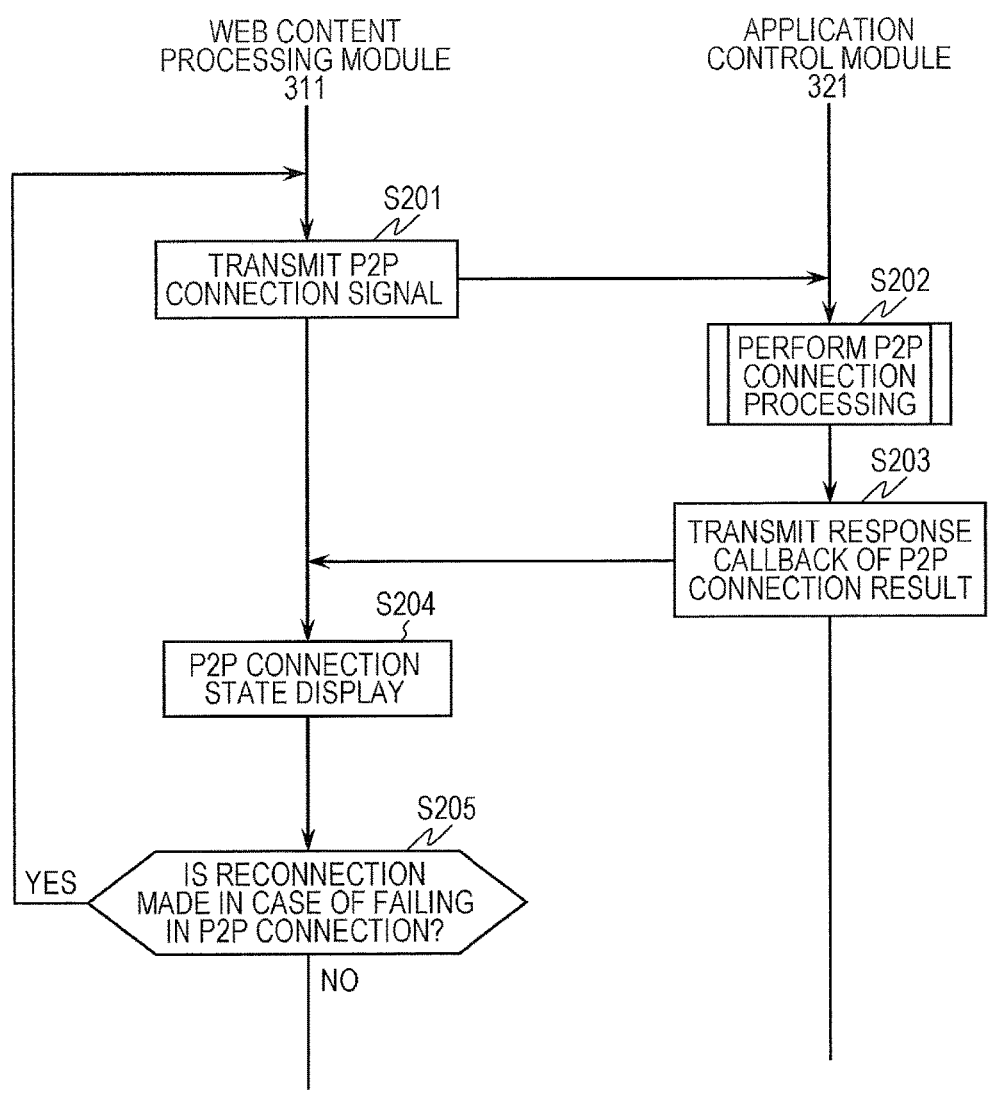
FIG. 12 is a diagram showing an example of a flowchart of P2P connection instruction processing in the exemplary embodiment.

Step S504 of FIG. 11 refers to P2P connection instruction processing in FIG. 12, and Step S510 of FIG. 11 refers to selection processing for the broadcast station in FIG. 14. Moreover, Step S202 in FIG. 12 refers to P2P connection processing in FIG. 13.

In Step S501, information processing device 31 transmits the user ID, which is input by user ID input unit 3101, to server 21 via user ID transmitter 3102.

In Step S502, server 21 executes login processing based on the user ID received by user ID acceptance unit 2001. Then, server 21 transmits a device ID list, which is associated with the user ID subjected to the login processing, to information processing device 31 via device ID list transmitter 2002.

In Step S503, device ID selector 3104 of information processing device 31 selects the device ID from the device ID list.

In Step S504, information processing device 31 performs the P2P connection processing, and thereby establishes the P2P connection with receiving device 11 identified by the selected device ID. Detailed contents of the P2P connection instruction processing will be described later with reference to FIG. 12.

Information processing device 31 executes processing of Step S506 to Step S509, which will be described later, before the P2P connection processing in Step S505 is completed.

For example, information processing device 31 simultaneously performs the processing for establishing the P2P connection in Step S504 and Step S505 and the processing for acquiring the display broadcast station list information in Step S506 to Step S509.

In Step S505, by P2P connection acceptance unit 1012, receiving device 11 accepts the request for the P2P connection from information processing device 31.

In Step S506, information processing device 31 transmits, to server 21, the display broadcast station list request signal for acquiring the display broadcast station list information corresponding to the device ID selected in Step S503 by display broadcast station list requester 3121.

In Step S507, broadcast station list request execution determination unit 2022 of server 21 determines whether or not to acquire the broadcast station list from receiving device 11 based on the device ID included in the display broadcast station list request signal received by display broadcast station list request acceptance unit 2021. In a case where it is necessary to acquire the broadcast station list, server 21 transmits the broadcast station list request signal to receiving device 11 via broadcast station list requester 2023. In a case where it is not necessary to acquire the broadcast station list, server 21 does not transmit the broadcast station list request signal to receiving device 11.

In Step S508, receiving device 11 transmits all or a part of the broadcast station list, which are received by receiving device 11, as a response to the broadcast station list request signal in Step S507 to server 21 via broadcast station list transmitter 1023.

In Step S509, server 21 converts the broadcast station list, which is received from receiving device 11, into the display broadcast station list information, and transmits the display broadcast station list information to information processing device 31 via display broadcast station list transmitter 2027.

In Step S510, information processing device 31 displays the display broadcast station list information, which is received from server 21, on broadcast station list display unit 3123.

When the user selects the broadcast station via broadcast station selector 3124, broadcast transmission instruction unit 3222 transmits the broadcast program transmission instruction signal, which includes the broadcast station identification ID, to receiving device 11 through the P2P connection established in Step S504. Detailed processing contents about the selection of the broadcast station and the reproduction of the broadcast program will be described later with reference to FIG. 14.

In Step S511, receiving device 11 transmits the broadcast program, which corresponds to the broadcast station identification ID included in the broadcast program transmission instruction signal received by broadcast transmission instruction acceptance unit 1024, via already converted broadcast transmitter 1026 to information processing device 31.

FIG. 12 is a flowchart showing the P2P connection instruction processing of information processing device 31. FIG. 12 shows details of the processing of Step S504 in FIG. 11. Here, a description is mainly made of the communication between WEB content processing module 311 and application control module 321.

In Step S201, P2P connection instruction unit 3110 included in WEB content processing module 311 of information processing device 31 transmits the P2P connection instruction signal to P2P connection instruction receiver 3205 of application control module 321.

In Step S202, P2P connection implementation unit 3206 of application control module 321 receives the P2P connection instruction from P2P connection instruction receiver 3205, and transmits the P2P connection request signal to receiving device 11. Detailed contents of the P2P connection processing will be described later with reference to FIG. 13.

In Step S203, P2P connection result transmitter 3207 of application control module 321 receives the P2P connection result of P2P connection implementation unit 3206, and transmits a response callback of the P2P connection result as the P2P connection result information to P2P connection result receiver 3111 of WEB content processing module 311.

In Step S204, broadcast station list display unit 3123 of WEB content processing module 311 receives the P2P connection result information, and displays a P2P connection state on the screen.

In Step S205, WEB content processing module 311 determines whether or not reconnection of the P2P connection is necessary in a case of failing in the P2P connection, and performs reconnection processing from Step S201 in a case where the reconnection is necessary. Note that the reconnection may be performed when the broadcast station is selected by broadcast station selector 3124. Moreover, the reconnection may be automatically performed a predetermined number of times.

Figure 13:
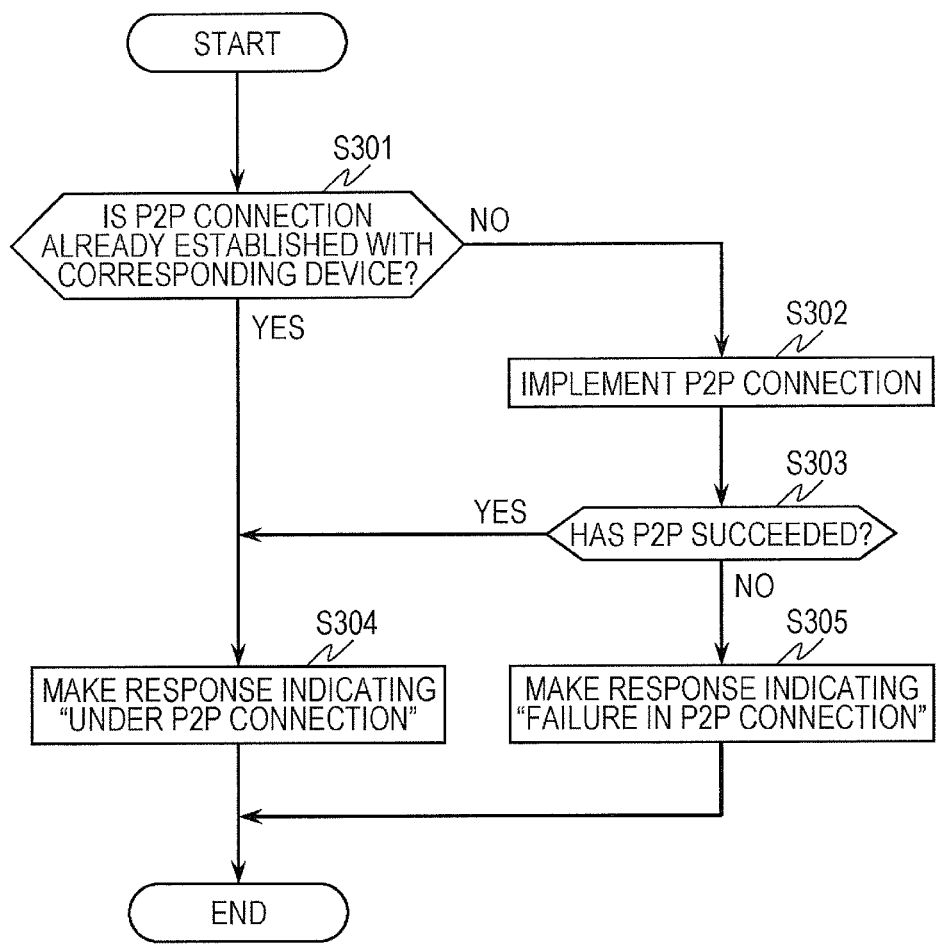
FIG. 13 is a diagram showing an example of a flowchart of P2P connection processing in the exemplary embodiment.

FIG. 13 is a flowchart showing the P2P connection processing in P2P connection implementation unit 3206 of application control module 321. FIG. 13 shows details of the P2P connection processing of FIG. 12.

In Step S301, P2P connection implementation unit 3206 determines whether or not the P2P connection is already established between receiving device 11 and information processing device 31.

In Step S302, in a case where the P2P connection is not established, P2P connection implementation unit 3206 transmits the P2P connection request signal to receiving device 11, and attempts the P2P connection.

In Step S303, P2P connection implementation unit 3206 determines whether or not the P2P connection has succeeded. The determination as to whether or not the P2P connection has succeeded is performed by making the P2P communication with a P2P connection destination (that is, receiving device 11), and by determining whether or not there is a response from receiving device 11.

In Step S304, P2P connection implementation unit 3206 makes a response, which indicates "under P2P connection", to P2P connection result transmitter 3207.

In Step S305, P2P connection implementation unit 3206 makes a response, which indicates "failure in P2P connection", to P2P connection result transmitter 3207.

[1-2-2. Broadcast Program Reproduction Processing]

With reference to FIG. 14, a description is made of processing for reproducing the broadcast program received through the P2P connection.

In Step S601, broadcast transfer instruction unit 3125 of WEB content processing module 311 determines whether or not to be under P2P connection with receiving device 11. That is, broadcast transfer instruction unit 3125 determines whether or not the P2P connection is established between receiving device 11 and information processing device 31. In a case where the P2P connection is not established between receiving device 11 and information processing device 31, the processing shifts to processing for making the P2P connection, and accordingly, this flowchart is ended.

In a case where the P2P connection is established between receiving device 11 and information processing device 31, then in Step S602, broadcast transfer instruction unit 3125 of WEB content processing module 311 transmits the broadcast transfer instruction signal, which includes the broadcast station identification ID, to broadcast transfer instruction receiver 3221 of application control module 321.

In Step S603, broadcast transmission instruction unit 3222 of application control module 321 transmits the broadcast program transmission instruction signal to receiving device 11 through the P2P connection, and thereby instructs receiving device 11 to transmit the broadcast program.

In Step S604, already converted broadcast receiver 3223 of application control module 321 receives the broadcast program from receiving device 11, and broadcast reproduction unit 3224 reproduces the broadcast program received from receiving device 11.

In Step S605, it is determined whether or not the reproduction of the broadcast program by broadcast reproduction unit 3224 is stopped.

In Step S606, a response to stop the broadcast is called back to WEB content processing module 311 when the reproduction of the broadcast program is stopped. WEB content processing module 311 displays the broadcast station list.

[1-3. Effects and the Like]

As described above, in communication system 1 in this exemplary embodiment, WEB content processing module 311 of information processing device 31 includes: display broadcast station list receiver 3122; and broadcast station selector 3124. Moreover, application control module 321 of information processing device 31 includes already converted broadcast receiver 3223 and P2P connection implementation unit 3206.

In this manner, the display information is provided from server 21 to information processing device 31 before the P2P connection is established between receiving device 11 and information processing device 31. Hence, before the P2P connection is established, it becomes possible to display the broadcast station list and to select the broadcast program. As a result, in the case of receiving the transfer of the broadcast program transmitted from the broadcast station, a waiting time of the user can be shortened while reducing the load of server 21 by the P2P connection.

Moreover, in communication system 1 in this exemplary embodiment, server 21 includes broadcast station list receiver 2024 and display broadcast station list converter 2026. Then, the display broadcast station list information as the conversion result in display broadcast station list converter 2026 can include information for controlling the expression format of the broadcast station list.

In accordance with the configuration as described above, the display broadcast station list information is changed in server 21, whereby it becomes possible to change the expression format of the broadcast station list in information processing device 31. That is, even if application software for displaying the broadcast station list is not updated in information processing device 31, the expression format of the broadcast station list can be changed with ease. For example, addition and the like of the information regarding the broadcast program, which is included in the broadcast station list, can be performed with ease, and flexibility of communication system 1 can be enhanced.

Other Exemplary Embodiments

As above, the exemplary embodiment has been described as the exemplification of the technique in this disclosure. For this purpose, the accompanying drawings and the detailed description are provided.

Hence, the constituent elements described in the accompanying drawings and the detailed description may include not only constituent elements which are essential for solving the problem, but also constituent elements which are provided for exemplifying the above-described technique and not essential for solving the problem. Therefore, it should not be immediately recognized that such non-essential constituent elements are essential based on the fact that the non-essential constituent elements are described in the accompanying drawings and the detailed description.

Note that the respective constituent elements in the above-mentioned exemplary embodiment may be configured by dedicated hardware, or alternatively, constituent elements realizable by software may be configured by software by a program control.

Note that, the transmission step of transmitting the information, the reception step of receiving the information, and the like, do not include processing performed by the hardware, for example, processing performed by the modem, the interface card and the like in the transmission step (that is, processing performed by only the hardware).

Moreover, the software by the program control may be distributed by being downloaded from the server and the like, or may be distributed by being recorded in a predetermined recording medium (for example, an optical disc such as a CD-ROM, a magnetic disk, a semiconductor memory and the like).

Moreover, the number of servers that execute the software by the program control may be single, or may be plural. That is, centralized processing may be performed, or distributed processing may be performed.

Moreover, the above-mentioned exemplary embodiment is for exemplifying the technique in this disclosure, and accordingly, can be subjected to varieties of alterations, replacements, additions, omissions and the like within the scope of claims or within the scope of equivalents thereof.

Note that, in the above-mentioned exemplary embodiment, the description has been made of the case where the first connection is the client-server connection, and the second connection is the P2P connection; however, the first connection and the second connection are not limited thereto. For example, the first connection may be an Internet connection, and the second connection may be a Bluetooth (registered trademark) connection. Moreover, for example, the first connection may be a Wi-Fi connection, and the second connection may be a Wi-Fi direct connection.

Moreover, in the above-mentioned exemplary embodiment, the first connection and the second connection are realized via the same communication network 40; however, the first connection and the second connection may be realized by communication networks different from each other.

Moreover, in the above-mentioned exemplary embodiment, the communication system includes the receiving device that transfers the broadcast program; however, the communication system may not necessarily include the receiving device as described above. For example, in place of the receiving device, the communication system may include a transfer device that transfers a stream, which is received from the Internet, to the information processing device. That is, the communication system only needs to include a transfer device that transfers one or more content items.

INDUSTRIAL APPLICABILITY

The present disclosure can shorten the waiting time of the user for establishing the connection between the receiving device and the information processing device at the time of transferring the broadcast program, which is received by the receiving device, from the receiving device, and the present disclosure is useful for a system that performs operations for reproducing the broadcast program. Specifically, the present disclosure is applicable to a hard disk recorder, a DVD recorder, a BD recorder, a TV, a portable terminal and the like.

The invention claimed is:

1. A communication system comprising:
a server;
an information processing device for reproducing a content item; and
a transfer device that transfers at least one content item out of one or more content items,
wherein the information processing device includes:
a display information receiver that receives display information for displaying a content list, which contains a list of the one or more content items, from the server through a first connection made based on a first communication mode;
a communication establishment unit that establishes a second connection between the transfer device and the information processing device, the second connection being made based on a second communication mode for performing communication between the transfer device and the information processing device without passing via the server;
a content selector that selects at least one content item out of the one or more content items based on the display information; and
a content receiver that receives the at least one content item, selected by the content selector, from the transfer device through the second connection established by the communication establishment unit,
wherein after the communication establishment unit starts to establish the second connection between the transfer device and the information processing device and before the second connection is established, the display information receiver receives the display information from the server through the first connection.

2. The communication system according to claim 1, wherein
the server includes:
a content list receiver that receives the content list from the transfer device; and
a display information converter that converts the content list into the display information, and
the display information includes information for controlling a display format of the content list.

3. The communication system according to claim 1, wherein the one or more content items are one or more broadcast programs receivable by the transfer device.

4. An information processing device comprising:
a display information receiver that receives display information, from a server, for displaying a content list as a list of one or more content items through a first connection made based on a first communication mode;
a communication establishment unit that establishes a second connection made based on a second communication mode different from the first communication mode;
a content selector that selects at least one content item out of the one or more content items based on the display information; and
a content receiver that receives the at least one content item, selected by the content selector, through the second connection established by the communication establishment unit,
wherein after the communication establishment unit starts to establish the second connection and before the second connection is established, the display information receiver receives the display information from the server through the first connection.

5. A communication method in a communication system including a server, an information processing device for reproducing a content item, and a transfer device that transfers at least one content item out of one or more content items, the communication method comprising:
establishing a second connection, the second connection being made based on a second communication mode for performing communication between the transfer device and the information processing device without passing via the server;
transmitting, together with a process for establishing the second connection, display information for displaying a content list, which contains a list of the one or more content items, from the server through a first connection made based on a first communication mode;
selecting at least one content item out of the one or more content items based on the display information; and
transferring the at least one selected content item from the transfer device to the information processing device through the established second connection,
wherein after the process for establishing the second connection between the transfer device and the information processing device starts and before the second connection is established, the display information from the server is received by the information processing device through the first connection.

6. The communication system according to claim 2, wherein the one or more content items are one or more broadcast programs receivable by the transfer device.

* * * * *